(12) United States Patent
Kalady et al.

(10) Patent No.: US 12,516,378 B2
(45) Date of Patent: Jan. 6, 2026

(54) PREDICTION OF POOR RESPONSE TO NEOADJUVANT CHEMORADIATION IN RECTAL CANCER PATIENTS USING A DNA REPAIR SCORE

(71) Applicant: THE CLEVELAND CLINIC FOUNDATION, Cleveland, OH (US)

(72) Inventors: Matthew Kalady, Cleveland, OH (US); Anamaria Aranha Camargo, Cleveland, OH (US); Rodrigo Oliva Perez, Cleveland, OH (US)

(73) Assignee: THE CLEVELAND CLINIC FOUNDATION, Cleveland, OH (US)

( * ) Notice: Subject to any disclaimer, the term of this patent is extended or adjusted under 35 U.S.C. 154(b) by 282 days.

(21) Appl. No.: 16/439,027

(22) Filed: Jun. 12, 2019

(65) Prior Publication Data
US 2019/0376145 A1    Dec. 12, 2019

Related U.S. Application Data

(60) Provisional application No. 62/683,658, filed on Jun. 12, 2018.

(51) Int. Cl.
*C12Q 1/68* (2018.01)
*C12Q 1/6886* (2018.01)
*G16B 25/10* (2019.01)

(52) U.S. Cl.
CPC .......... *C12Q 1/6886* (2013.01); *G16B 25/10* (2019.02); *C12Q 2600/106* (2013.01); *C12Q 2600/158* (2013.01)

(58) Field of Classification Search
None
See application file for complete search history.

(56) References Cited

U.S. PATENT DOCUMENTS

2005/0069863 A1* 3/2005 Moraleda ............. G16B 40/10
                                                     702/19
2011/0217713 A1* 9/2011 Weaver ............. C12Q 1/6886
                                                    435/6.12

OTHER PUBLICATIONS

Suwinski et al; PLOS One, 7(7): e41379, 2012; pp. 1-6.*
Cheng et al; Cancer Sci (2015); pp. 1678-1686, vol. 106.*
Lai et al; Tumor Biol; 2016, pp. 2127-2136.*
Muino et al; BioMed Research International; Article ID 921435; 2015, pp. 1-10.*
Balch et al; World J Gastroenterol, 2006, vol. 12, pp. 3186-3195.*
Hori et al; Med Mol Morphol, 201, 50:25-33.*
He et al; Cell Death and Disease, 9:164; Feb. 2018.*
Jimenez et al; Clinical Cancer Research, Abstract A01, Jan. 2, 2018.*
Wada et al; Oncology Letters, vol. 15, pp. 3766-3771 (Year: 2018).*
Gaertner, Wolfgang B., et al. "Rectal cancer: An evidence-based update for primary care providers." World Journal of Gastroenterology: WJG 21.25 (2015): 7659.
Ghosn, Marwan, et al. "Anal cancer treatment: current status and future perspectives." World Journal of Gastroenterology: WJG 21.8 (2015): 2294.
Glynne-Jones, R., et al. "Rectal cancer: ESMO Clinical Practice Guidelines for diagnosis, treatment and follow-up." (2017): iv22-iv40.
Koyama, F. C., et al. "Effect of Akt activation and experimental pharmacological inhibition on responses to neoadjuvant chemoradiotherapy in rectal cancer." British Journal of Surgery 105.2 (2018): e192-e203.
Lebovitz, Daniel J., et al. "Lung ultrasound utility in the management of the neurologically deceased organ donor." Progress in Transplantation 26.3 (2016): 210-214.
Watanabe, Toshiaki, et al. "Prediction of response to preoperative chemoradiotherapy in rectal cancer by using reverse transcriptase polymerase chain reaction analysis of four genes." Diseases of the Colon & Rectum 57.1 (2014): 23-31.

* cited by examiner

*Primary Examiner* — Jehanne S Sitton
(74) *Attorney, Agent, or Firm* — Tarolli, Sundheim, Covell & Tummino LLP

(57) ABSTRACT

One aspect of the present disclosure relates to a method for predicting the response of a patient having rectal cancer to neoadjuvant chemoradiation therapy. The method can include determining a DNA repair score. The DNA repair score can be based on DNA repair genes whose expression levels are associated with a response to neoadjuvant chemoradiation. A low DNA repair score as compared to a predetermined threshold value is indicative of a poor response to the neoadjuvant chemoradiation therapy.

4 Claims, 4 Drawing Sheets

PREDICTION OF POOR RESPONSE TO NEOADJUVANT CHEMORADIATION IN RECTAL CANCER PATIENTS USING A DNA REPAIR SCORE

RELATED APPLICATIONS

This application claims the benefit of U.S. Provisional Application No. 62/683,658, filed Jun. 12, 2018, entitled "Prediction of Tumor Response to NCRT Using a DNA Repair Derangement Score." This provisional application is hereby incorporated by reference in its entirety for all purposes.

TECHNICAL FIELD

The present disclosure relates generally to treating rectal cancer and, more specifically, to methods for predicting the response of a patient having rectal cancer to neoadjuvant chemoradiation using a DNA repair score.

BACKGROUND

Despite clinical advances, rectal cancer remains a significant cause of cancer-related death. Treatment strategies and clinical outcomes are determined by cancer stage as defined by local tumor penetration and the spread to lymph nodes or distant organs. Randomized trials have shown that the best local control rate for rectal cancer patients is achieved after a short course of radiation and chemotherapy ("neoadjuvant chemoradiotherapy") followed by optimal surgery. Development of significant tumor regression after neoadjuvant chemoradiation therapy (nCRT) may spare a considerable proportion of patients from total mesorectal excision (TME). When nCRT was almost exclusively used in patients with locally advanced disease with high-risk for local recurrence, complete response was observed in up to 25% of cases. However, select patients with less advanced disease have also been offered nCRT. In the absence of high-risk factors for local recurrence after TME, these patients would not require any kind of nCRT for optimal local disease control. However, as these patients are otherwise candidates for definitive stomas or poor anorectal function, nCRT has been used for the purpose of achieving a complete clinical response (cCR). The use of nCRT here (among patients with early stage disease) could avoid the potentially unnecessary morbidity, mortality and functional consequences associated with TME.

Even though patients with early-stage disease are more likely to achieve and sustain a cCR (≥50% sustained complete clinical response rate), a significant proportion will still harbor residual disease. This particular group of patients (that did not necessarily require radiation from an oncological standpoint) still have to face major surgery in the setting of a previously irradiated pelvis with its detrimental consequences to healing and functional outcomes.

SUMMARY

The present disclosure relates generally to methods of treating rectal cancer and, more specifically, to methods for predicting the response of a patient having rectal cancer to neoadjuvant chemoradiation therapy (nCRT) by using a DNA repair score.

In one aspect, the present disclosure can include a method for predicting the response of a patient having rectal cancer to nCRT. One step of the method can include determining a DNA repair score. A low DNA score as compared to a predetermined threshold value is indicative of a poor response to the nCRT.

In another aspect, the present disclosure can include a method for treating a patient having rectal cancer. A first step of the method can include determining a DNA repair score of the patient. A rectal cancer treatment, other than nCRT, can be administered to the patient if the patient's DNA repair score is low as compared to a predetermined threshold value indicative of a poor response to the nCRT.

In some instances, the DNA repair score can be determined by the following method: (a) obtaining a tumor biopsy sample from the patient; (b) assaying the biopsied tumor sample to determine expression values of DNA repair genes associated with a good response to nCRT and a poor response to nCRT; and (c) calculating the DNA repair score based on the expression values of the DNA repair genes associated with a good response and a poor response to nCRT.

In some instances, the DNA repair score can be calculated by (a) multiplying the expression values of the DNA repair genes associated with a good response to nCRT by +1 to obtain corresponding good response to nCRT weighted gene expression values; and (b) multiplying the expression values of the DNA repair genes associated with a poor response to nCRT by −1 to obtain corresponding poor response to nCRT weighted gene expression values; and determining the DNA repair score by calculating the sum of the weighted gene expression values obtained in steps (a) and (b).

In some instances, the DNA repair genes associated with a good response to nCRT that can be expressed and used to calculate the patient's DNA repair score include one or more of the following: XPA, XRCC3, UBE2A, APEX2, ATRIP and NEIL2. In one example, DNA repair genes associated with a good response to nCRT that can be used to calculate the patient's DNA repair score are XPA, XRCC3, UBE2A, APEX2, and NEIL2.

In some instances, the DNA repair genes associated with a poor response to nCRT whose expression can be assayed and used to calculate the patient's DNA repair score are XRCC4 and/or HTLF. In one example, the DNA repair gene associated with a poor response to nCRT that can be used to calculate the patient's DNA repair score is XRCC4.

In some instances, expression of DNA repair genes can be assayed using qRT-PCR, RNA-Seq, microarrays, or a combination thereof.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
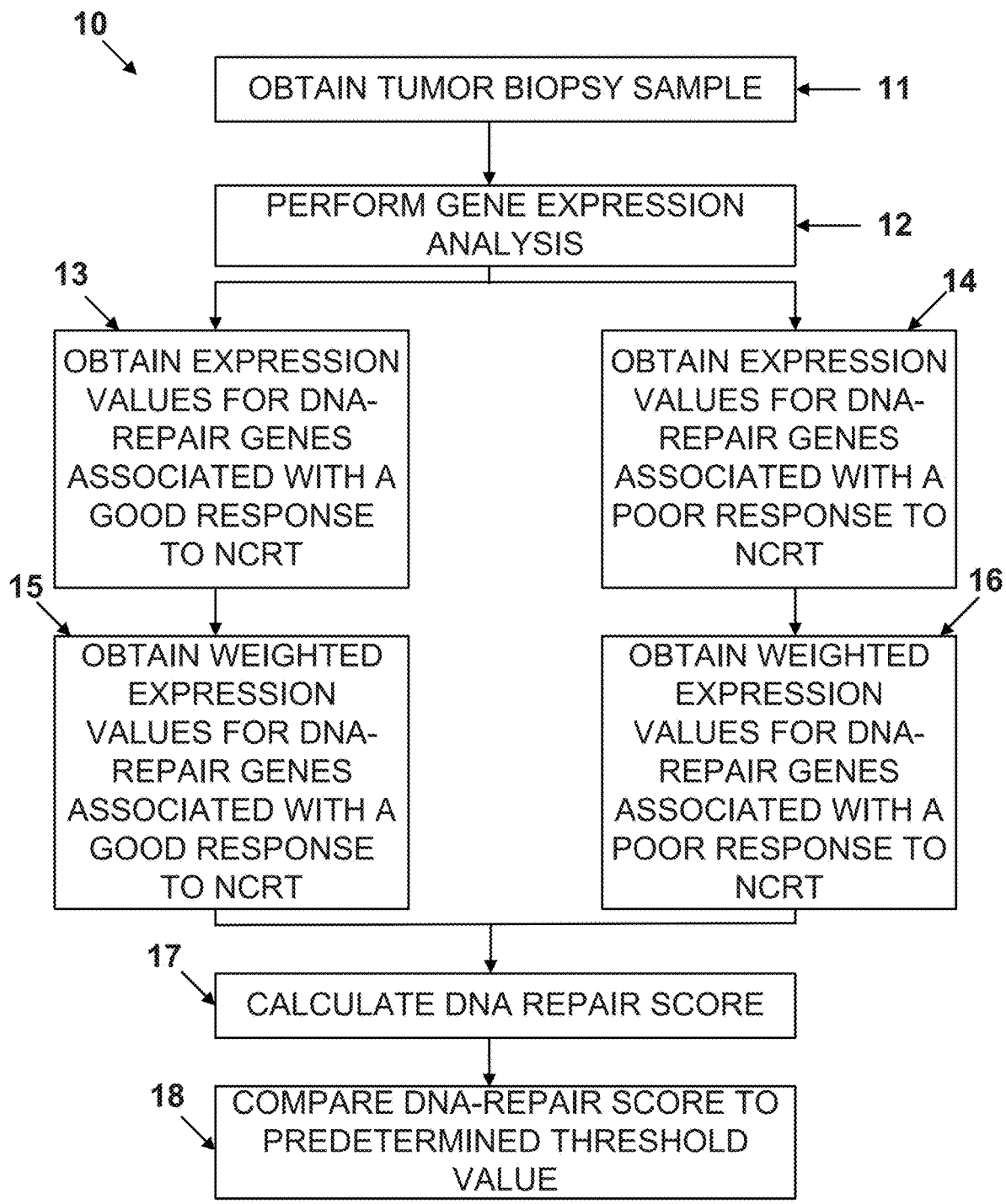
FIG. 1 is a block diagram illustration of an exemplary method for predicting the response of a patient having rectal cancer to neoadjuvant chemoradiation therapy (nCRT) using a DNA repair score.
Figure 2:
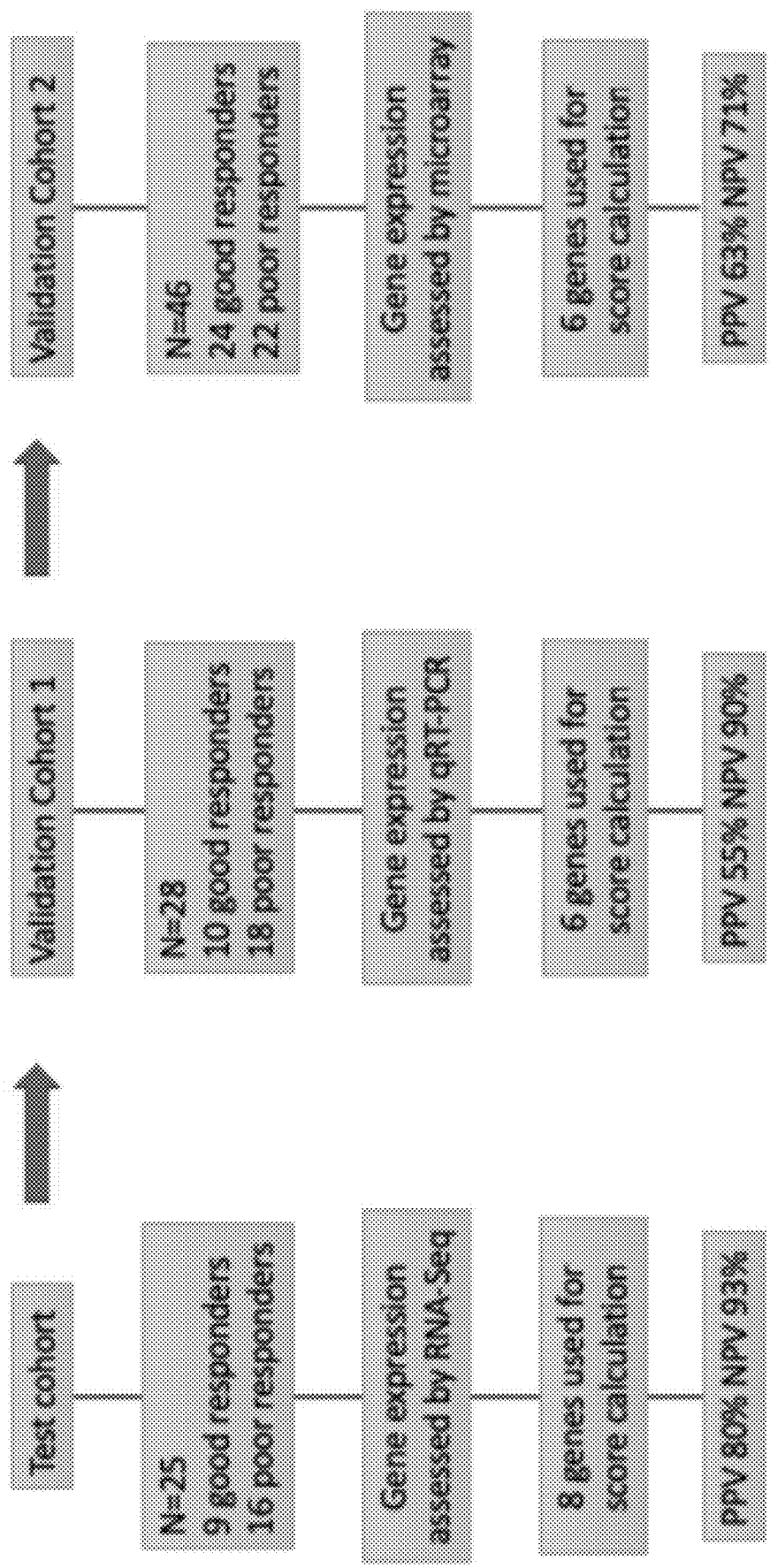
FIG. 2 is a block diagram illustration showing the study design for the Test Cohort, Validation Cohort 1, and Validation Cohort 2 in Example 1 of the present application.

Unless otherwise defined, all technical terms used herein have the same meaning as commonly understood by one of ordinary skill in the art to which the present disclosure pertains.

In the context of the present disclosure, the singular forms "a," "an" and "the" can also include the plural forms, unless the context clearly indicates otherwise.

The terms "comprises" and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the terms "cancer" and "tumor" are synonymous terms. The term "cancer" or "tumor" can refer to the presence of cells possessing characteristics typical of cancer-causing cells, such as uncontrolled proliferation, immortality, metastatic potential, rapid growth and proliferation rate, and certain characteristic morphological features. Cancer cells are often in the form of a tumor, but such cells can exist alone within an animal, or can be a non-tumorigenic cancer cell.

As used herein, the term "rectal cancer" can refer to a disease in which malignant (cancer) cells form in the tissues of the rectum.

As used herein, the term "neoadjuvant chemoradiation therapy (nCRT)" can refer to treatment that combines chemotherapy with radiation therapy that is administered to a patient before the patient undergoes surgery.

As used herein, the term "DNA repair genes" can refer to genes involved in DNA repair.

As used herein, the term "DNA repair score" can refer to a score derived from a calculation provided by expression levels of genes involved in the DNA repair pathway. This is calculated from expression levels of genes (e.g., DNA repair genes) within the tumor.

As used herein, the term "poor response to nCRT" can include (i) a lack of reduction in tumor size ($\geq$50%) between pre- and post-treatment status based on imaging or endoscopic appearance, (ii) a lack of decrease in primary tumor level (T-level) stage between pre and post-treatment status based on imaging, and/or (iii) more than 10% residual cancer cells within the primary tumor determined by histopathology of the resected specimen or AJCC groups 2-3.

As used herein, the term "good response to nCRT" can include (i) a reduction in primary tumor size ($\geq$50%) between pre- and post-treatment status based on imaging or endoscopic appearance, (ii) a decrease in the primary tumor level (T-level downstage) based on imaging, (iii) 0% residual cancer cells in the resected specimen or AJCC groups 0-2, and/or (iv) sufficient regression of the primary tumor such that there is no immediate need for surgery with follow-up, and/or sufficient regression of the primary tumor such that there is no need for full-thickness local excision of the residual tumor.

As used herein, the term "treating" can relate to reversing, alleviating, inhibiting the progress of, or preventing a specific disorder or condition, prophylaxis of a specific disorder or condition (e.g., rectal cancer), or alleviation of the symptoms associated with a specific disorder or condition and/or preventing or eliminating said symptoms.

As used herein, the term "gene expression" or "expression" can refer to the transcription of a DNA molecule into a transcribed RNA molecule and/or the translation of the RNA transcript to produce a polypeptide. Accordingly, the expression of a gene can be detected and quantified by measuring either its RNA transcript or the polypeptide gene product.

As used herein, the term "predetermined threshold value" can refer to a predetermined DNA repair score to which a test value (DNA repair score) is compared to determine whether a patient is a poor responder to nCRT. The DNA repair score of a test subject (i.e., patient) is compared to a predetermined threshold value (or range of values) that is derived from DNA repair scores of good and poor responders to nCRT in comparable biological samples of control patients. These control values can be calculated in the same manner as the DNA repair score is calculated for a test subject (discussed below), and may have been obtained earlier, in which case they can also be referred to as reference values. In one example, the predetermined threshold value is calculated by: (a) obtaining a tumor biopsy sample from a patient known to have rectal cancer (a control patient) and having undergone nCRT; (b) assaying the biopsied tumor sample to determine expression values of DNA repair genes associated with a good response to nCRT and a poor response to nCRT; and (c) calculating the DNA repair score based on the expression values of the DNA repair genes associated with a good response to nCRT and a poor response to nCRT. In this example, when the DNA repair score of a test patient is less than (e.g., statistically less than) the DNA repair score of the control patient, the test patient is likely a poor responder to nCRT. Statistical significance can be determined by known statistical methods, such as ROC analysis and the methods described in Example 1 below.

As used herein, the following AJCC pathological tumor response grades have the following meanings: (i) AJCC-0, complete response, defined as the lack of viable cancer cells; (ii) AJCC-1, moderate response, defined as single cells or small groups of cancer cells; (iii) AJCC-2 minimal response, defined as residual cancer outgrown by fibrosis; and (iv) AJCC-3 poor response, defined as minimal or no tumor response.

II. Overview

The present disclosure relates generally to predicting how a patient having rectal cancer will respond to nCRT. Many patients with early-stage rectal cancer undergo nCRT. However, nCRT is not always successful and there is no accurate way to predict if a patient will respond (poorly or good) to nCRT. As discussed below, the present disclosure remedies these shortcomings by providing a predictive test that can identify patients unlikely to achieve significant response to nCRT. From this test, methods of treatment are also provided.

The present disclosure is based, at least in part, on the surprising finding that deregulated expression of DNA-repair genes in rectal tumors contributes to poor response to nCRT. From this finding, a molecular score (or DNA-repair score) based on expression levels of DNA-repair genes was developed and tested in multiple cohorts of patients with rectal cancer undergoing similar nCRT regimens. This means that, in some instances, patients with rectal cancer at low risk for local recurrence may benefit from the use of this score prior to considering nCRT for the purpose of achieving a complete clinical response (cCR) and avoiding total mesorectal excision (TME). Eight DNA repair genes have been discovered whose combined expression levels can be used to differentiate between patients who are predicted to be either a good or poor responder to nCRT. Six of these DNA repair genes were associated with a good response to nCRT, and two of these DNA repair genes were associated with a poor response to nCRT. Four different DNA-repair pathways, known to repair DNA lesions induced by 5FU and ionizing radiation, are represented among these eight genes. Combining expression levels from different DNA repair genes is advantageous because DNA repair pathways are tightly linked and interdependent, different DNA repair pathways can be concomitantly deregulated in tumor cells and, as discovered by the inventors, most tested genes did not show significant differences in expression levels between poor and good responders; yet, using a score based on the combined expression of DNA-repair genes (i.e., instead of individual genes) was found to be predictive of poor-responders to nCRT.

IV. Methods

One aspect of the present disclosure is shown in FIG. 1 and includes a method 10 for predicting the response of a patient having rectal cancer to nCRT. In some instances, the patient is a human patient. For purposes of simplicity, the method 10 is shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the method 10. Additionally, one or more steps that implement the method 10, such as gene expression analysis (Step 12) and/or calculating a DNA-repair score (Step 17), may involve use of a non-transitory memory and one or more processors.

A first step of the method 10 can include obtaining a tumor biopsy sample from a patient having rectal cancer (Step 11). Techniques for obtaining tumor biopsies are known in the art. For example, a tumor biopsy sample can be obtained by fine needle biopsy, fine needle aspiration biopsy, core needle biopsy, open surgical biopsy, or material from a rectal tumor that was entirely or partially resected. The biopsy sample can be fresh or it can be frozen and stored before further testing is conducted.

Methods for diagnosing rectal cancer are known in the art. Generally, such methods may include colonoscopy, proctoscopy, biopsy, molecular testing of the tumor, blood tests, computed tomography (CT) scan, magnetic resonance imaging (MRI), ultrasound, chest X-ray, angiography, and positron emission tomography (PET) scan. See, e.g., Glynne-Jones, R. et al., *Annals of Oncology*, Vol. 28, Issue suppl 4, pp. iv22-iv40 (July 2017), Gaertner, W B et al., *World J Gastroenterol*. v. 21(25); 2015 Jul. 7, Ghosn, M. et al., *World J Gastroenterol*. v. 21(8); 2015 Feb. 28.

In some instances, the biopsy sample can be obtained before the patient has undergone nCRT. In other instances, the biopsy sample can be obtained while the patient is undergoing nCRT. In further instances, the biopsy sample can be obtained after the patient has undergone nCRT but before the patient receives additional nCRT.

At Step 12, gene expression analysis is conducted on the obtained biopsy sample. In some instances, gene expression analysis is conducted for one or more expressed DNA-repair genes. DNA-repair genes whose expression can be assayed at Step 12 include any gene (or genes) comprising a DNA-repair pathway. Examples of DNA-repair pathways can include the nucleotide excision repair (NER) pathway, the base excision repair (BER) pathway, the homologous recombination (HR) pathway, the non-homologous end joining (NHEJ) pathway, the Fanconi anemia pathway (FA), and the mismatch repair (MMR) pathway. In some instances, the gene (or genes) that can be assayed for expression in the respective DNA-repair pathway can include the following: BER and NER pathways (XPA, NEIL2 and APEX2); HR pathway (XRCC3, UBE2A, ATRIP and HTLF); and NHEJ pathway (XRCC4). In one example, the obtained biopsy sample can be assayed for expression for one or more of the following DNA-repair genes: XPA, XRCC3; UBE2A; APEX2; ATRIP; NEIL2; HTLF; and XRCC4.

Gene expression analysis can be carried out using methods well known in the art including, but not limited to, qRT-PCR, RNA-Seq, microarray, and combinations thereof. In one example, gene expression can be quantified using a comparative ΔCt method. In this method, the expression level of individual DNA-repair genes in a given tumor biopsy sample can be determined as threshold cycle value (Ct value) and be normalized by the expression level of a reference gene (e.g., PUM1). Normalized Ct values can be calculated by subtracting the Ct value of the reference gene from the Ct value of the DNA repair gene. Normalized Ct values can then be used for score calculation. Thus, the comparative ΔCt method can be used for direct quantification of gene expression in different samples (good or poor responders) in the absence of an external reference group.

At Steps 13 and 14, expression values are obtained for DNA repair genes associated with a good response to nCRT and DNA repair genes associated with a poor response to nCRT, respectively. In some instances, elevated expression of one or more of XPA, XRCC3, UBE2A, APEX2, ATRIP, and NEIL2 can be associated with a good response to nCRT. In other instances, elevated expression of one or more of HTLF and XRCC4 can be associated with a poor response to nCRT.

At Step 15, a weighted expression value (or values) is obtained for DNA-repair genes whose expression is associated with a good response to nCRT. The weighted expression value for DNA-repair genes whose expression is associated with a good response to nCRT can be obtained by multiplying the expression value (or values) of DNA-repair gene(s) associated with a good response to nCRT (e.g., expressed as either RPKM, normalized Ct value or normalized hybridization intensity) by +1.

At Step 16, a weighted expression value (or values) is obtained for DNA-repair genes whose expression is associated with a poor response to nCRT. The weighted expression value for DNA-repair genes whose expression is associated with a poor response to nCRT can be obtained by multiplying the expression value (or values) of DNA-repair gene(s) associated with a poor response to nCRT (e.g., expressed as either RPKM, normalized Ct value or normalized hybridization intensity) by −1.

At Step 17, a DNA-repair score can be calculated. The DNA-repair score can be calculated as the sum of the weighted expression values (obtained in Steps 15-16) of all genes whose expression levels were associated with response (good or poor) to nCRT. In one example, a DNA-repair score can be calculated by summing the weight expression of XPA, XRCC3, UBE2A, APEX2, ATRIP, NEIL2, HTLF and XRCC4. The inventors of the present application surprisingly discovered that most of the assayed DNA-repair genes did not show significant differences in expression levels between poor and good responders. Advantageously, the DNA-repair score is derived from the combined expression of DNA-repair genes (instead of individual genes), which better represents the biological role of multiple genes, e.g., given that DNA repair pathways are tightly linked and interdependent, and different DNA repair pathways can be concomitantly deregulated in tumor cells.

At Step 18, the patient's DNA-repair score can then be compared to a predetermined threshold value. For example, the calculated DNA-repair score and the predetermined threshold value can be compared, and the difference displayed, by a computer software program. In some instances, a low DNA-repair score is indicative of a poor response to nCRT.

Another aspect of the present disclosure can include a method for treating a patient (e.g., a human patient) having rectal cancer. One step of the method can include determining a DNA-repair score for the patient. Determining the DNA-repair score can be performed as shown in *FIG.* 1 and described above. Where the determined DNA-repair score is low as compared to a predetermined threshold value indicative of a poor response to nCRT, the patient can be administered a rectal cancer treatment other than nCRT. In other words, the patient is not treated with nCRT and, if the patient has already started nCRT, then nCRT is discontinued and a different therapy administered to treat the patient. For example, the patient can undergo surgery (e.g., radical surgery) for treatment of rectal cancer.

V. Experimental

The following Example is for the purpose of illustration only is not intended to limit the scope of the appended claims.

Example 1

This Example demonstrates that select DNA repair genes can be used to predict whether or not a patient having rectal cancer will respond poorly to nCRT.

Methods

Test and Validation Cohorts.

The study included three different cohorts, the Test Cohort and two Validation Cohorts. A flow chart with study design and specific information from each cohort is available in *FIG.* 2.

The Test cohort comprised tumor samples from 25 consecutive patients with rectal cancer undergoing nCRT at the Angelita & Joaquim Gama Institute (AJGI)-São Paulo, Brazil (Table 1). Gene expression analysis in these tumors was carried out using RNAseq and was analyzed as previously described (Koyama et al., Br J Surg. 2018; 105(2): e192-e203; Lopes-Ramos et al., Cancer Genet. 2015; 208 (6):309-326).

TABLE 1

|  | Validation 1 (n = 25) | Test (n = 25) | P |
|---|---|---|---|
| Age (years) | 57.5 ± 10.6 | 58.6 ± 10.6 | 0.72 |
| Gender (male-female) | 16-9 (64%-36%) | 17-8 (68%-32%) | 0.76 |
| Tumor size (cm) | 4.7 ± 1.5 | 4.3 ± 0.7 | 0.30 |
| Distance anal verge (cm) | 6.2 ± 3.2 | 4.6 ± 2.3 | 0.04 |
| cT |  |  | 0.54 |
| 1 | 1 (4%) | — |  |
| 2 | 2 (8%) | 3 (12%) |  |
| 3 | 21 (84%) | 21 (87%) |  |
| 4 | 1 (4%) | — |  |
| cN+ | 13 (52%) | 13 (54%) | 0.88 |
| ypT |  |  |  |
| 0 | 9 (36%) | 9 (36%) | 0.23 |
| 1 | 1 (4%) | — |  |
| 2 | 7 (28%) | 2 (8%) |  |
| 3 | 7 (28%) | 13 (52%) |  |
| 4 | 1 (4%) | 1 (4%) |  |
| ypN+ | 7 (28%) | 7 (28%) | 1.00 |
| Response |  |  | 0.77 |
| Good | 10 (40%) | 9 (36%) |  |
| Poor | 15 (60%) | 16 (64%) |  |

The Validation Cohort 1 comprised tumor samples from 24 consecutive patients with rectal cancer undergoing nCRT at the Cleveland Clinic—Cleveland, Ohio, USA and 4 consecutive patients from the AJGI (Table 1). Gene expression analysis in these tumors was carried out using qRT-PCR as described below.

The Validation Cohort 2 comprised tumor samples from 46 rectal cancer patients from an independent institution in Japan. Gene expression analysis in these tumors was carried out using microarrays as described elsewhere (Watanabe et al., Dis Colon Rectum. 2014; 57(1):23-31 19). Gene expression profiles were determined by using affymetrix hG-u133 Plus 2.0 GeneChips (Affymetrix, Santa Clara, Ca). Microarray expression data and tumor regression grades were downloaded from Gene Expression Omnibus (GEO) under the accession number GSE35452 and re-analyzed using Limma package.

Staging and Neoadjuvant CRT.

Baseline staging for patients in all cohorts included pelvic magnetic resonance (MR) and abdominal/chest computed tomography (CT). nCRT was used for all patients with tumors located below the peritoneal reflection (defined by MR sagittal sequences) and mrT3/4 or mrN+ disease. Patients with mrT2N0 were also considered for nCRT if otherwise considered for abdominal perineal excision or ultra-low anterior resection. In the Test and Validation Cohort 1, patients received 50.4-54.0 Gy of radiation to the pelvis concomitant to 5FU-based chemotherapy, while the Validation Cohort 2 patients received 50.4 Gy of radiation concomitant to Tegafururacil (300-500 mg/day).

Assessment of Tumor Response and Surgery.

Patients were assessed for tumor response at least 6-10 weeks from radiation therapy completion. In the Test Cohort, all patients with cCR were managed by no immediate surgery (Watch and Wait; as per Institutional guidelines), whereas patients with incomplete clinical response were managed by radical surgery. In the Validation Cohort 1 & 2, all patients were managed by radical surgery regardless of tumor response (as per Institutional guidelines). TME surgical principles were uniform between all cohorts. In the Test and Cohort 1 pathological tumor response was graded according to AJCC recommendations as follows: AJCC-0, complete response, defined as the lack of viable cancer cells; AJCC-1, moderate response, defined as single cells or small groups of cancer cells, AJCC-2 minimal response, defined as residual cancer outgrown by fibrosis; and AJCC-3 poor response, defined as minimal or no tumor response. Patients were grouped according to tumor response into two groups: i) poor responders: patients with incomplete clinical responses (IR) and with significant residual disease (AJCC-2/3) after final pathological staging, ii) good responders: patients with cCR managed by observation alone and with sustained response without evidence of recurrence after at least 24 months follow-up and patients with complete pathological response or minimal residual disease (AJCC-0/1) after surgery. In Cohort 2 pathological tumor response was graded according to JSCCR grading system. Patients were grouped according to tumor response into two groups: i) poor responders: patients with JSCCR grades 2 or 3; or ii) good responders: patients with JSCCR grades 0 or 1.

Tumor Samples and RNA Extraction.

Biopsy-specimens were collected prospectively during endoscopic examination before nCRT. All fragments were snap-frozen in liquid nitrogen and stored at −80° C. immediately after endoscopic biopsies. Before RNA extraction, all fragments were analyzed for the presence of at least 80% adenocarcinoma with H&E staining. Briefly, total RNA was extracted with Trizol reagent (Invitrogen, Carlsbad, CA), and RNA quality was evaluated on a 2100 Bioanalyzer (Agilent, Santa Clara, CA). All samples had an RNA integrity number (RIN) >6. Ribosomal RNA was depleted from total RNA using the RiboMinus Eukaryote Kit for RNA-Seq (Invitrogen). Sequences were aligned against the human reference genome (hg19; GRCh 37) using Tophat2 (22) and Gencode data (Build 15) as the transcriptome database. Aligned sequences were merged, and only those alignments with quality >20 (Q>20) were used for further analysis. Gene expression quantification was performed with the HTSeq-count. Gene expression was defined as the number of sequences by gene, followed by a RPKM (reads per kilobase of transcript per million mapped reads) normalization. Pretreatment biopsies from the Validation Cohort 2 were collected and processed as previously described (Watanabe et al., Dis Colon Rectum. 2014; 57(1):23-31 19).

DNA-Repair Genes and Response to nCRT.

A list of 170 genes involved in DNA-repair was extracted from The Kyoto Encyclopedia of Genes and Genomes and from the REPAIRtoire database. The list of DNA-repair genes analyzed in this study includes genes from all 6 main DNA-repair pathways: non-homologous end-joining (NHEJ), homologous recombination (HR), Fanconi anemia pathway (FA), nucleotide excision repair (NER), mismatch repair (MMR) and base excision repair (BER) (Table 2). RNA-Seq expression data from the Test Cohort was used for the identification of DNA-repair genes whose expression levels were associated with good or poor response to nCRT. The mean expression values in RPKM (reads per kilobase of transcript per million mapped reads) for each DNA-repair gene in the groups of patients were compared with good or poor response to nCRT using the Mann-Whitney U test, followed by the Benjamini Hochberg's test for multiple testing correction. Using this approach, only 8 differentially expressed DNA repair genes between good and poor responders were identified.

TABLE 2

| ALKBH2 | EME2   | HELQ   | NUDT1 | RAD18  | SHFM1  | CETN2  | FANCE  | MSH5  | POLN   |
|--------|--------|--------|-------|--------|--------|--------|--------|-------|--------|
| ALKBH3 | ENDOV  | HLTF   | OGG1  | RAD23A | SHPRH  | CHAF1A | FANCF  | MSH6  | POLQ   |
| APEX1  | ERCC1  | HUS1   | PALB2 | RAD23B | SMUG1  | CHEK1  | FANCG  | MUS81 | PRKDC  |
| APEX2  | ERCC2  | LIG1   | PARP1 | RAD50  | SPRTN  | CHEK2  | FANCI  | MUTYH | PRPF19 |
| APLF   | ERCC3  | LIG3   | PARP2 | RAD51  | TDG    | CLK2   | FANCL  | NABP2 | RAD1   |
| APTX   | ERCC4  | LIG4   | PARP3 | RAD51B | TDP1   | DCLRE1A| FANCM  | NBN   | RAD17  |
| ATM    | ERCC5  | MAD2L2 | PCNA  | RAD51C | TDP2   | DCLRE1B| FEN1   | NEIL1 | GTF2H4 |
| ATR    | ERCC6  | MBD4   | PER1  | RAD51D | TOPBP1 | DCLRE1C| GEN1   | NEIL2 | RECQL5 |
| ATRIP  | ERCC8  | MDC1   | PMS1  | RAD52  | TP53   | DDB1   | GTF2H1 | NEIL3 | REV3L  |
| BLM    | EXO1   | MGMT   | PMS2  | RAD54B | TP53BP1| DDB2   | GTF2H2 | POLG  | RIF1   |
| BRCA1  | FAAP20 | MLH1   | PMS2P3| RAD54L | TREX1  | DMC1   | GTF2H3 | POLH  | RNF168 |
| BRCA2  | FAAP24 | MLH3   | PNKP  | RAD9A  | TREX2  | DUT    | MRE11A | POLI  | RNF4   |
| BRIP1  | FAN1   | MMS19  | POLB  | RBBP8  | UBE2A  | EME1   | MSH2   | POLK  | RNF8   |
| CCNH   | FANCA  | MNAT1  | POLD1 | RECQL  | UBE2B  | FANCC  | MSH3   | POLL  | RPA1   |
| CDK7   | FANCB  | MPG    | POLE  | RECQL4 | UBE2N  | FANCD2 | MSH4   | POLM  | RPA2   |
| XRCC3  | XRCC5  | NTHL1  | RPA4  | SETMAR | H2AFX  | UNG    | WRN    | XPA   | XRCC1  |
| XRCC4  | XRCC6  | RPA3   | RRM2B | NHEJ1  | UBE2V2 | UVSSA  | XAB2   | XPC   | XRCC2  | qRT-PCR Analysis

Gene expression analysis in the Validation Cohort 1 was carried out using qRT-PCR. Briefly, cDNA synthesis was performed using SuperScript II (Invitrogen® by Thermo Fisher Scientific). Primers used for qRT-PCR (Table 3) were designed using Primer 3 and synthesized by Exxtend Biotecnologia Ltda (Paulinia, SP). Amplification reactions were performed in duplicates using a 7300 Real-time PCR System (Life Technologies). Expression of each DNA repair gene was measured in independent qRT-PCR experiments and amplification specificity was checked using melting curves. The expression level of individual DNA-repair genes in a given sample was determined as threshold cycle value (Ct value) and was normalized by the expression level of a reference gene (PUM1). Normalized Ct values were calculated by subtracting the Ct value of the reference gene from the Ct value of the DNA repair gene (Ct DNA repair gene–Ct Reference gene). Normalized Ct values were then used for score calculation. This comparative ΔCt method was used for direct quantification of gene expression in different samples (good and poor responders) in the absence of an external reference group.

TABLE 3

| Genes | | Sequence 5'-3' |
|---|---|---|
| APEX2 | Forward | CACCGCCCCATTGACCCT |
| | Reverse | GCACCCAAGTTACTGAGCAA |
| NEIL2 | Forward | CCTGTCTGCTATACACTGCTGGACC |
| | Reverse | CTGAACCGAGAGAAAGGGGATG |
| UBE2A | Forward | TACTTCAGAACCGTTGGAGTCCA |
| | Reverse | TCCCGTTTGTTCTCCTGGTACA |
| XPA | Forward | GAAGTTTGGGGTAGTCAAGAAGCA |
| | Reverse | CTCCCTTTTCCACACGCTGC |
| XRCC4 | Forward | CAGAACCTAAAATGGCTCCTCAGG |
| | Reverse | GGTCTTCTGGGCTGCTGTTTC |
| XRCC3 | Forward | CGTTCCAGGAGAGCTGCTTC |
| | Reverse | ATGCCCCGAGACAGCAGTAC |

DNA Repair Score Calculation.

For each patient, the expression value of DNA-repair genes associated with good response to nCRT (expressed either as RPKM, normalized Ct value or normalized hybridization intensity) was multiplied by +1 and the expression value of genes associated with poor response to nCRT was multiplied by −1. The DNA Repair score of a given patient was then calculated as the sum of the weighted expression values of all genes whose expression levels were associated with response to nCRT. Therefore, individual genes influenced the overall score based on their association with response (good/poor) and expression levels. The Mann-Whitney test was used to compare the average DNA-repair scores among the group of patients with good and poor response to nCRT. Individual cut-offs for each individual cohort (using distinct gene-expression platforms) were used for the classification between High/Low DNA repair score in an attempt to estimate prediction of response (good/poor response). The accuracy, sensitivity, specificity, Positive Predictive Value (PPV), Negative Predictive Value (NPV) of the DNA repair score in the different data sets were determined through the construction of ROC curves using the Delong method and R software (version 3.2).

Results

Expression Levels of DNA-Repair Genes and Response to nCRT.

Figure 3:
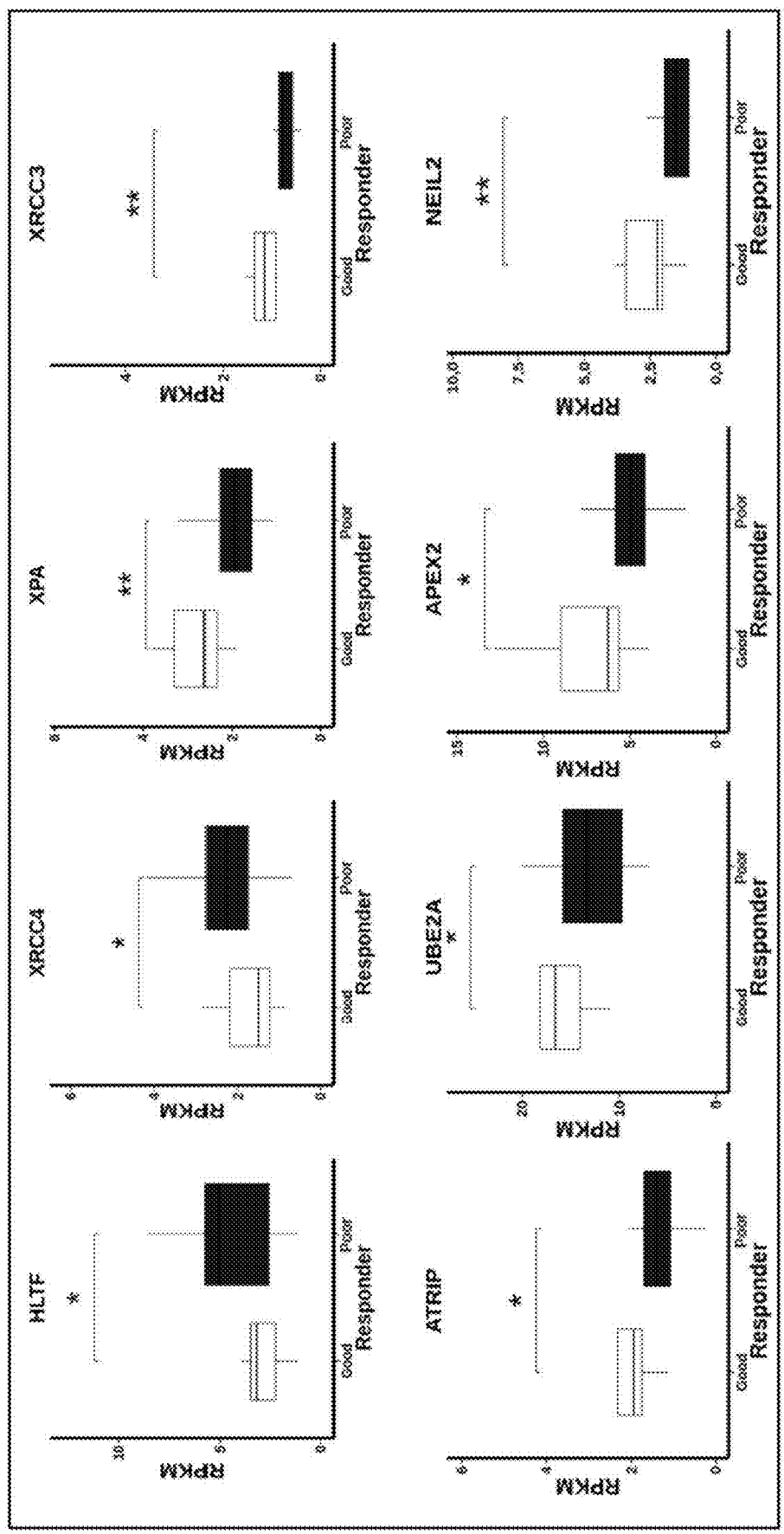
FIG. 3 shows graphs displaying DNA repair genes differentially expressed in rectal tumors from patients with good and poor response to nCRT. Gene expression levels were determined using RNASeq and are represented in RPKM (Reads per Kilobase Million). *p<0.05, Mann-Whitney test.

For the identification of DNA-repair genes whose expression levels were associated with response to nCRT, RNA-Seq expression data was used from 25 rectal cancer patients submitted to nCRT (Test Cohort—9 good responders and 16 poor responders). From the initial set of 170 genes coding for the main six DNA-repair pathways, 2 genes with elevated expression that showed a significant association with poor response to nCRT (HTLF, XRCC4) were selected, as well as 6 genes with elevated expression that were associated with good response to nCRT (XPA, XRCC3, ATRIP, UBE2A, APEX2, NEIL2) (FIG. 3). Four different DNA-repair pathways, known to repair DNA lesions induced by 5FU and ionizing radiation, are represented among these 8 genes: BER and NER (XPA, NEIL2 and APEX2), HR (XRCC3, UBE2A, ATRIP, HTLF) and NHEJ (XRCC4) pathways.

Development of the DNA-Repair Score.

Figures 4A, 4B, 4C:
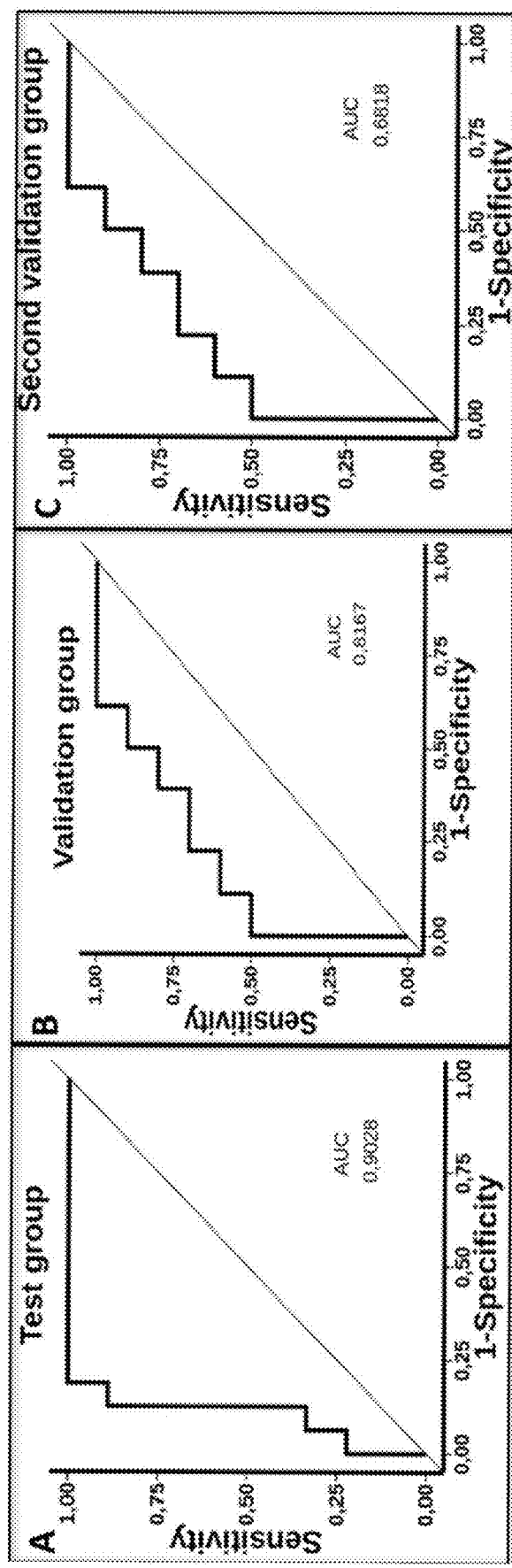
FIGS. 4A-C are graphs displaying receiver operating characteristic (ROC) analysis of the DNA repair deregulation score in predicting response to nCRT. The area under the curve (AUC) was calculated for ROC curves, and sensitivity and specificity was calculated to assess score performance in three independent cohorts Test Cohort (FIG. 4A), Validation Cohort 1 (FIG. 4B) and Validation Cohort 2 (FIG. 4C). The area under the curve is a measure of accuracy. The closer the curve follows the upper-left border of the ROC space, the more accurate the test. The closer the curve comes to the 45-degree diagonal of the ROC space, the less accurate the test.

A DNA-repair score was calculated for each rectal cancer patient from the Test Cohort by summing the weight expression level of each of the 8 genes whose expression levels were associated with response to nCRT. There was a significant difference in DNA score values between patients with good response and those with poor response to nCRT in the Test Cohort (28.34 vs. 16.20; p<0.001). ROC analysis was then used to determine the predictive accuracy of the DNA repair score. In the Test Cohort, the DNA repair score showed 89% sensitivity, 88% specificity, 88% accuracy for the classification of patients according to response to nCRT, with an area under the curve (AUC) of 0.9028, positive predictive value (PPV) of 80% and negative predictive value (NPV) of 93%, using a cut-off of >21.4 (Table 4 and FIG. 4A).

TABLE 4

DNA Repair Score: Diagnostic Characteristics

| Cutoff | TP | TN | FP | FN | Specificity | Sensitivity | PPV | NPV |
|---|---|---|---|---|---|---|---|---|
| Test cohort - RNA seq (8 genes were used to calculate the score) | | | | | | | | |
| 21.46 | 8 | 14 | 2 | 1 | 88% | 89% | 80% | 93% |
| Validation Cohort 1 - qPCR (6 genes were used to calculate the score) | | | | | | | | |
| 9.41 | 9 | 9 | 9 | 1 | 50% | 90% | 50% | 90% |
| Validation Cohort 2 - microarray (6 genes were used to calculate the score) | | | | | | | | |
| 0.46 | 20 | 10 | 12 | 4 | 45% | 83% | 63% | 71% |

TP: True Positive;
TN: True Negative;
FP: False Positive;
FN: False Negative;
PPV: Positive Predictive Value;
NPV: Negative Predictive Value.

Validation of the DNA-Repair Score.

The predictive accuracy of the DNA-repair score was validated in two independent cohorts of rectal cancer patients submitted to nCRT (Validation Cohort 1 and Cohort 2). The Validation Cohort 1 comprised tumors from 28 rectal cancer patients (10 good responders and 18 poor responders). Gene expression analysis in this cohort was carried out using qRT-PCR. Notwithstanding, during the process of qRT-PCR standardization, quantifying the expression levels of HTLF and ATRIP genes proved to be difficult. Both genes presented extremely low expression levels (Ct>35 cycles) and showed significant variations in Ct values between duplicates (>2 cycles). Therefore, these 2 genes were excluded from subsequent analysis. Normalized Ct values were used for DNA repair score calculations. There was a significant difference in DNA score values between patients with good response and those with poor response to nCRT in the Validation Cohort 1 (11.4 vs. 9.0; p=0.002). In the Validation Cohort 1, the DNA repair score showed 90% sensitivity, 50% specificity, 64% accuracy for the correct classification of patients according to response to nCRT, with an AUC of 0.8167, PPV of 55% and NPV of 90% using a cut-off of >9.4 (Table 2 and FIG. 4B).

In Validation Cohort 2 (24 good responders and 22 poor responders), microarray gene expression data was downloaded from GEO and normalized hybridization intensities were used for score calculation. Hybridization intensities for genes HTLF and ATRIP were below the hybridization background, confirming their extremely low expression levels and these genes were once more excluded from subsequent analysis. Here, there was a significant difference in DNA score values between patients with good response and those with poor response to nCRT in the Validation Cohort 2 (1.914 vs. 0.974; p=0.035). The DNA repair score showed 83% sensitivity, 45% specificity, 65% accuracy for the correct classification of patients according to response to nCRT, with an AUC of 0.6818, PPV of 63% and NPV of 71% using a cut-off of >0.46 (Table 2 and FIG. 4C).

All patent applications, patents, and printed publications cited herein are incorporated herein by reference in the entireties, except for any definitions, subject matter disclaimers or disavowals, and except to the extent that the incorporated material is inconsistent with the express disclosure herein, in which case the language in this disclosure controls.

What is claimed is:

1. A method of treating a patient having rectal cancer comprising: assaying a biopsied tumor sample from the patient to determine expression values of DNA repair genes in the sample, wherein the DNA repair genes comprise DNA repair genes associated with a good response to nCRT comprising XPA, XRCC3, UBE2A, APEX2, ATRIP and NEIL2; and XRCC4, which is a DNA repair gene associated with a poor response to nCRT; calculating the DNA repair score using the expression values of the DNA repair genes;

determining if the DNA repair score is higher than a predetermined threshold value; and administering neoadjuvant chemoradiation therapy (nCRT) to the patient if the DNA repair score is higher than a predetermined threshold value, and otherwise treating the patient using radical surgery or local excision.

2. The method of claim 1, further comprising:

calculating a DNA repair score by:

(a) multiplying the expression values of the DNA repair genes associated with a good response to nCRT by +1 to obtain a good response to nCRT weighted gene expression values;

(b) multiplying the expression values of the DNA repair gene associated with a poor response to nCRT by −1 to obtain a poor response to nCRT weighted gene expression values;

(c) determining the DNA repair score by calculating the sum of the weighted gene expression values obtained in (a) and (b); and administering neoadjuvant chemoradiation therapy (nCRT) to the patient if the DNA repair score is higher than a predetermined threshold value, and otherwise treating the patient using radical surgery or local excision.

3. The method of claim 1, wherein expression values for the DNA repair genes are determined using qRT-PCR, RNA-Seq, microarrays, or a combination thereof.

4. The method of claim 1, further comprising obtaining the tumor biopsy sample from the patient.

* * * * *